(12) United States Patent
Liu et al.

(10) Patent No.: US 9,923,661 B2
(45) Date of Patent: Mar. 20, 2018

(54) DEVICE ELEMENT, NODE DEVICE, AND METHOD AND SYSTEM FOR ADJUSTING TUNNEL BANDWIDTH

(71) Applicant: ZTE Corporation, Shenzhen (CN)

(72) Inventors: Wenbin Liu, Shenzhen (CN); Xilin Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/778,697

(22) PCT Filed: Mar. 21, 2014

(86) PCT No.: PCT/CN2014/073887
§ 371 (c)(1),
(2) Date: Sep. 21, 2015

(87) PCT Pub. No.: WO2014/146610
PCT Pub. Date: Sep. 25, 2014

(65) Prior Publication Data
US 2016/0050044 A1  Feb. 18, 2016

(30) Foreign Application Priority Data
Mar. 21, 2013 (CN) .......................... 2013 1 0092281

(51) Int. Cl.
*H04J 14/08* (2006.01)
*H04J 14/00* (2006.01)
*H04J 3/16* (2006.01)

(52) U.S. Cl.
CPC .......... *H04J 14/086* (2013.01); *H04J 3/1652* (2013.01); *H04J 2203/0069* (2013.01); *H04Q 2213/1301* (2013.01)

(58) Field of Classification Search
None
See application file for complete search history.

(56) References Cited

U.S. PATENT DOCUMENTS

2012/0099862 A1* 4/2012 Lin ....................... H04J 3/1664
398/45
2012/0163812 A1* 6/2012 Youn .................... H04J 3/1658
398/45

(Continued)

FOREIGN PATENT DOCUMENTS

CN  101854220 A  10/2010
CN  102195864 A   9/2011

(Continued)

OTHER PUBLICATIONS

European Search Report for corresponding application EP 14 76 9186; Reported dated Jan. 25, 2016.

(Continued)

*Primary Examiner* — Oommen Jacob
(74) *Attorney, Agent, or Firm* — Cantor Colburn LLP

(57) ABSTRACT

Provided are a device unit, a node device, and a method and a system for automatically adjusting a tunnel bandwidth. The device unit includes: a client side element, configured to dynamically adjust The quantity of the first timeslots according to a bandwidth of a received data service before the received data service is mapped to an Optical Channel Data Unit (ODU) tunnel; a line side element, configured to configure, according to the quantity of the first timeslots adjusted by the client side element, The quantity of the second timeslots matched with the first timeslots; a tunnel managing element, configured to adjust, according to the quantity of the first timeslots and the quantity of the second timeslots, the quantity of unblocked ODU tunnels between the client side element and the line side element, wherein unblocked ODU tunnels after the adjustment carry the data service. When the bandwidth of the received data service increases or decreases, the device unit of the present disclosure flexibly controls usage of an ODU0 timeslot in an ODU of each stage, and does not need to use a complicated (Continued)

ODUflex frame format, thereby meeting the requirement of automatically adjusting the bandwidth without using ODUflex.

14 Claims, 8 Drawing Sheets

(56) References Cited

U.S. PATENT DOCUMENTS

| | | | |
|---|---|---|---|
| 2012/0170936 A1* | 7/2012 | Vissers | H04J 3/1658 398/58 |
| 2012/0189304 A1* | 7/2012 | Lin | H04J 3/1652 398/43 |
| 2012/0224857 A1 | 9/2012 | Su | |
| 2012/0281983 A1* | 11/2012 | Youn | H04J 3/1658 398/45 |
| 2013/0064555 A1* | 3/2013 | Kitajima | H04J 3/0608 398/154 |
| 2014/0086581 A1* | 3/2014 | Youn | H04B 1/74 398/45 |
| 2014/0169782 A1* | 6/2014 | Hashiguchi | H04J 14/0291 398/5 |
| 2016/0028474 A1* | 1/2016 | Rahn | H04J 3/14 398/5 |
| 2016/0043852 A1* | 2/2016 | Su | H04J 14/00 398/52 |
| 2016/0050044 A1* | 2/2016 | Liu | H04J 14/086 398/98 |
| 2016/0197691 A1* | 7/2016 | Su | H04J 3/1652 398/45 |

FOREIGN PATENT DOCUMENTS

| | | |
|---|---|---|
| CN | 102571544 A | 7/2012 |
| EP | 2512078 A1 | 10/2012 |

OTHER PUBLICATIONS

Fangwei Hu Bhumip Khasnabish ZTE USA Inc:, "I2RS overlay use case; draft-hu-i2rs-overlay-use-case-00.txt", Internet Engineering Task Force, Mar. 11, 2013 (Mar. 11, 2013). pp. 1-9. XP015092052.
Fatai Zhang et al: "Generalized Multi-Protocol Label Switching (GMPLS) Signaling Extensions for the evolving G.709 Optical Transport Networks Control", Internet Engineering Task Force, Feb. 21, 2013 (Feb. 21, 2013). pp. 1-28, XP015092526.
International Search Report for corresponding application PCT/CN2014/073887 filed Mar. 21, 2014; dated Jun. 11, 2014.

* cited by examiner

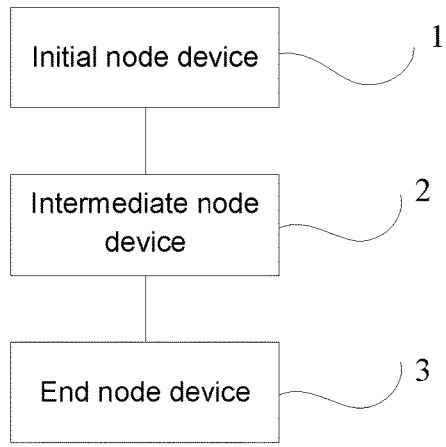
Fig. 9
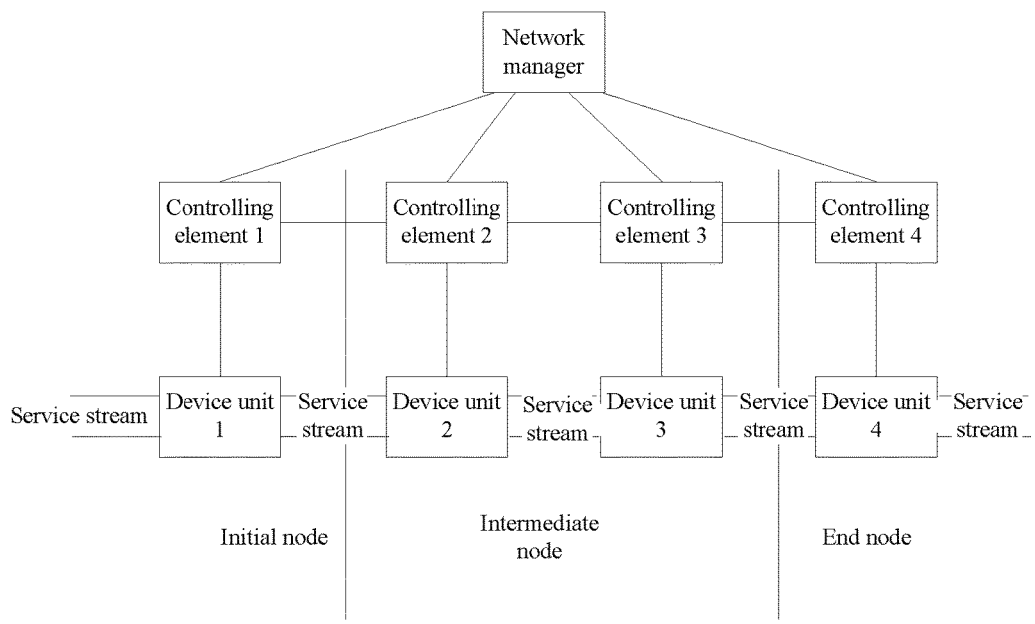
Fig. 10
| Node identifier | Adjustment request identifier (bandwidth increase or decrease) | Port serial number of client side element (Optical port or timeslot port) | Timeslot sequence set | Timeslot sequence set | Port serial number of line side element (Optical port or timeslot port) | Timeslot sequence set |
|---|---|---|---|---|---|---|
Fig. 11

DEVICE ELEMENT, NODE DEVICE, AND METHOD AND SYSTEM FOR ADJUSTING TUNNEL BANDWIDTH

TECHNICAL FIELD

The present disclosure relates to the field of bandwidth adjustment, including a device element, a node device, and a method and system for adjusting a tunnel bandwidth.

BACKGROUND

As a core technology of a next generation transport network, an Optical Transport Network (OTN), which is able to manage and schedule a large volume of services, has become a mainstream technology of a backbone network. The OTN is urged by the rapid growth of the demanded quantity of the data services and the continuous development of packet networks to better support various client service signals constantly and map these signals of different rates to corresponding OTN containers.

Existing standard OTN containers include Optical Channel Data Units (ODU) including ODU0, ODU1, ODU2, ODU3, ODU4 and so on, and ODUflex and the like have been further extended by the new G709 V3, wherein the ODUflex is able to carry a Constant Bit Rate (CBR) service and a packet service at any rate. When a packet service is carried, the packet service is generally packaged in the ODUflex by a Generic Framing Procedure (GFP), and the ODUflex further configures a capacity of the container according to a size of the service.

The ODUflex technology in the related art at least has the following disadvantages: the frame format of the ODUflex is a standard frame format defined by G709 V3, which has increase the complexity in implementing OTN-related standards, and requires a solution of developing a corresponding new OTN transmultiplexer, i.e. a brand new framing chip, so to map and demap an OTUflex frame. However, a current relatively mature frame chip fails to satisfy a requirement of OTUflex. Besides, a solution for adjusting an OTUflex bandwidth in the related art needs to use complicated protocols and transmit a large amount of overhead information on each node of a service path during bandwidth adjustment, and the protocols increases the complexity and a large amount of messages increase the risk of errors.

As a matter of fact, any data-oriented packet may be packaged in a GFP frame and mapped to an ODU container while this ODU container is not necessarily OTUflex. The standard OTN containers defined previously, including ODU0, ODU1, ODU2, ODU3, ODU4 and so on can absolutely satisfy the requirement of flexible configuration according to a size of a service.

SUMMARY

The present disclosure fully uses existing mature containers of various rates of an OTN to provide a method for automatically adjusting a tunnel bandwidth, so as to solve the problem in the related art that a standard OTN container cannot be well applied and an ODUflex technology that complicates an OTN container is applied instead in the bandwidth adjustment.

A device unit is provided in the embodiment of the present disclosure, including: a client side element, configured to dynamically adjust the quantity of the first timeslots according to a bandwidth, wherein the bandwidth is a bandwidth of a received data service before the data service is mapped to an ODU tunnel; a line side element, configured to configure, according to the quantity of the first timeslots adjusted by the client side element, the quantity of second timeslots matched with the first timeslots; a tunnel managing element, configured to adjust, according to the quantity of the first timeslots and the quantity of the second timeslots, the quantity of unblocked ODU tunnels between the client side element and the line side element, wherein unblocked ODU tunnels after the adjustment carry the data service.

A node unit is provided, including the device unit and further including: a controlling element, configured to receive the quantity of the first timeslots sent by the client side element, and send the quantity of the first timeslots to the line side element for adjustment of the quantity of the second timeslots, and configured to receive the adjusted quantity of the second timeslots sent by the line side element, and configured to send to the tunnel managing element, according to the quantity of the first timeslots and the quantity of the second timeslots, an instruction for adjusting the quantity of the unblocked ODU tunnels between the client side element and the line side element.

A system for adjusting a tunnel bandwidth is provided, including: an initial node device, configured to dynamically adjust the quantity of timeslots according to a bandwidth of a received data service, and configured to adjust, according to the adjusted quantity of the timeslots, the quantity of ODU tunnels for carrying the received data service, and transmit bandwidth adjustment information to an intermediate node device and an end node device; the intermediate node device, configured to receive the bandwidth adjustment information transmitted by the initial node device, and correspondingly adjust the quantity of the timeslots and the quantity of the ODU tunnels for carrying the data service; the end node device, configured to receive the bandwidth adjustment information transmitted by the initial node device, and correspondingly adjust the quantity of the timeslots and the quantity of the ODU tunnels for carrying the data service.

A method for automatically adjusting a tunnel bandwidth, including that the quantity of first timeslots is adjusted dynamically according to a bandwidth, wherein the bandwidth is a bandwidth of a received data service before the data service is mapped to an ODU tunnel; the quantity of second timeslots matched with first timeslots is configured according to the adjusted quantity of the first timeslots; and the quantity of unblocked ODU tunnels between the client side element and the line side element is adjusted according to the quantity of the first timeslots and the quantity of the second timeslots, wherein unblocked ODU tunnels after the adjustment carry the data service.

The technical solution of the present disclosure has the following beneficial effect: compared with the ODUflex technology in the related art, the method fully uses existing mature OTN containers (ODU0, ODU1, ODU2, ODU3, ODU4 and so on), and uses ODU0 as the smallest timeslot unit to flexibly control usage of an ODU0 timeslot in an ODU of each stage when a bandwidth increases or decreases, and does not need to use a complicated ODUflex frame format, thereby meeting the requirement of automatically adjusting the bandwidth without using the ODUflex and having good application prospect and use value.

BRIEF DESCRIPTION OF THE DRAWINGS

FIG. 9 is a structural block diagram of a system for adjusting a tunnel bandwidth according to an embodiment of the present disclosure;

FIG. 10 is a hierarchical graph of a system for adjusting a tunnel bandwidth according to an embodiment of the present disclosure;

FIG. 11 is a structural diagram of a message of bandwidth adjustment information according to an embodiment of the present disclosure;

DETAILED DESCRIPTION OF THE EMBODIMENTS

To make the technical problem to be solved by the present disclosure, technical solutions and advantages clearer, detailed description will be provided below with reference to the accompanying drawings and specific embodiments.

Figure 1:
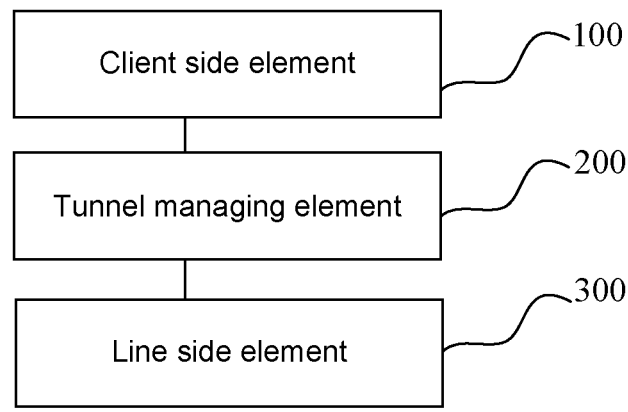
FIG. 1 is a structural block diagram of a device unit according to an embodiment of the present disclosure.

FIG. 1 shows a structural block diagram of a device unit according to an embodiment of the present disclosure. The device unit includes:

a client side element 100, configured to dynamically adjust the quantity of the first timeslots according to a bandwidth, wherein the bandwidth is a bandwidth of a received data service before the received data service is mapped to an ODU tunnel;

a line side element 200, configured to configure, according to the quantity of the first timeslots adjusted by the client side element, the quantity of the second timeslots matched with the first timeslots;

a tunnel managing element 300, configured to adjust, according to the quantity of the first timeslots and the quantity of the second timeslots, the quantity of unblocked ODU tunnels between the client side element and the line side element, wherein unblocked ODU tunnels after the adjustment carry the data service.

The device unit of the present disclosure flexibly controls usage of an ODU0 timeslot in an ODU of each stage when the bandwidth of the received data service increases or decreases, fully uses existing mature containers of various rates of an OTN, and does not need to use a complicated ODUflex frame format, thereby meeting the requirement of automatically adjusting the bandwidth without using ODUflex.

Figure 2:
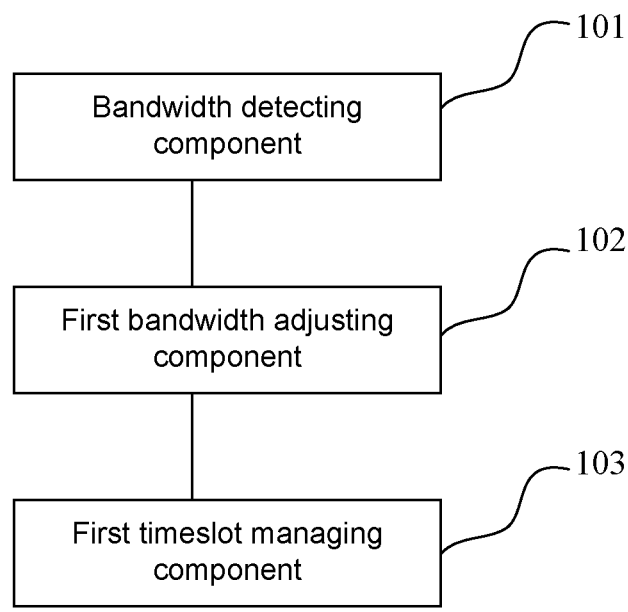
FIG. 2 is a structural block diagram of the client side element according to an embodiment of the present disclosure.

FIG. 2 shows a structural block diagram of the client side element according to an embodiment of the present disclosure. The client side element further includes:

a bandwidth detecting component 101, configured to detect the bandwidth of the received data service before the data service is mapped to the ODU tunnel;

a first bandwidth adjusting component 102, configured to compare the bandwidth of the received data service with a preset threshold, and determine, according to a comparison result, a bandwidth flow required to be adjusted;

a first timeslot managing component 103, configured to dynamically adjust the quantity of the first timeslots according to the bandwidth flow required to be adjusted.

Figure 3:
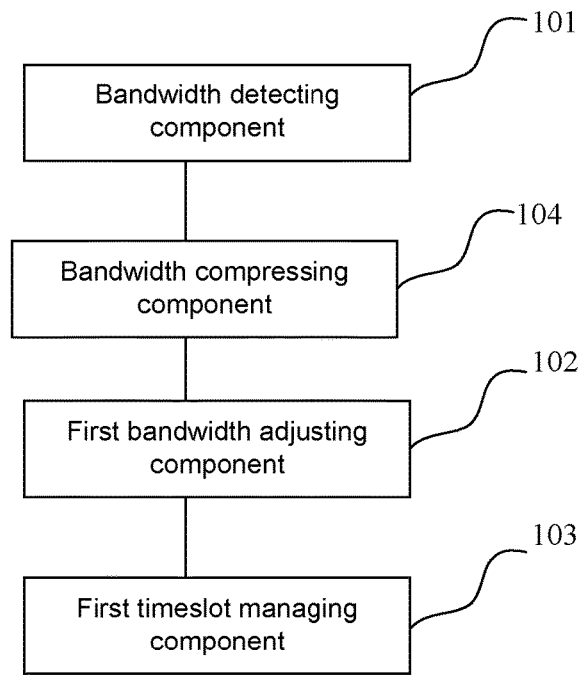
FIG. 3 is a structural block diagram of the client side element according to a second embodiment of the present disclosure.

FIG. 3 shows a structural block diagram of the client side element according to a second embodiment of the present disclosure, which is substantially the same as the first embodiment, and what is different is that the client side element further includes: a bandwidth compressing component 104, configured to compress the received data service, and transmit the compressed data service to the bandwidth detecting component. When the service data passes through the bandwidth compressing component or a controlling element of a second layer, an idle frame is deleted from the service so as to compress the bandwidth, and then the compressed service data is mapped to the ODU tunnel Before the service data is mapped to the ODU tunnel after the bandwidth is compressed, the bandwidth detecting component detects the bandwidth, and a bandwidth flow may be detected by using an existing detection technology.

Figure 4:
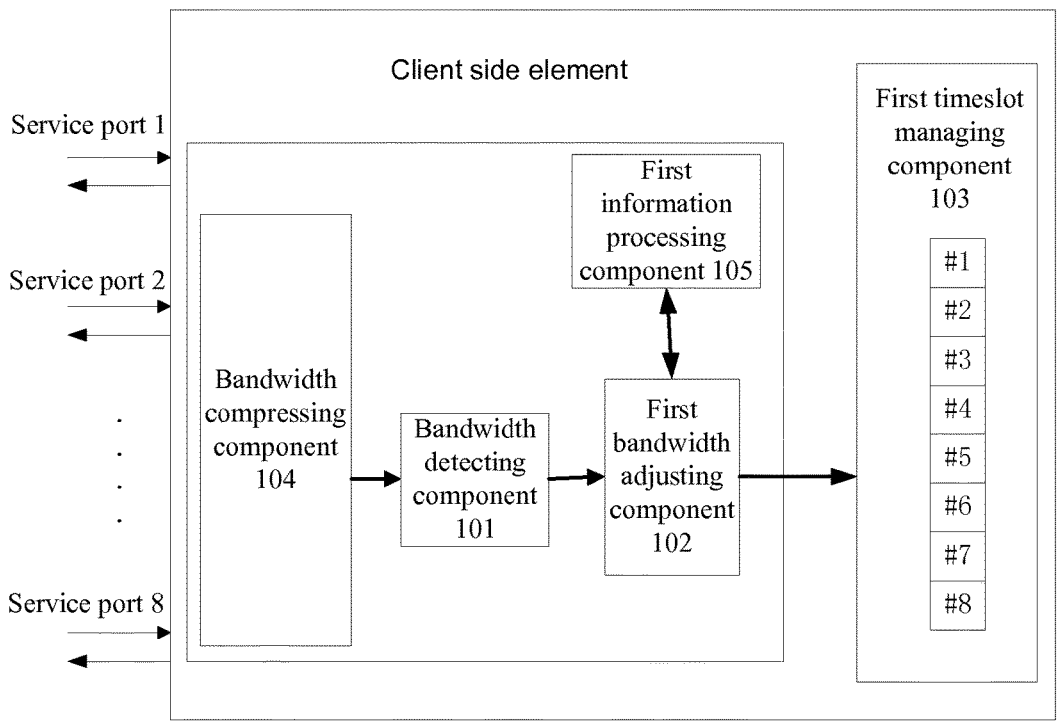
FIG. 4 is a diagram illustrating internal functions of the client side element according to an embodiment of the present disclosure.

FIG. 4 shows a diagram illustrating internal functions of the client side element according to an embodiment of the present disclosure. The service data passes through service ports 1 to 8 via the data service and enters the client side element, and may further enter the client side element via one or more service ports. A corresponding relation between the serial number of the service ports and timeslots is established so that the unified services are carried by new and old tunnels. The client side element further includes: a first information processing element 105, configured to receive from the first bandwidth adjusting component 102 the bandwidth flow required to be adjusted and receive control information for controlling the first timeslot managing component to adjust the quantity of the first timeslots, so that the first timeslot managing component adjusts the quantity of the first time slots.

Figure 5:
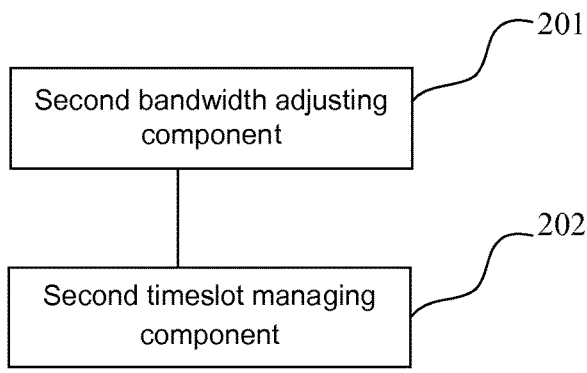
FIG. 5 is a structural block diagram of the line side element according to an embodiment of the present disclosure.

FIG. 5 shows a structural block diagram of the line side element according to an embodiment of the present disclosure. The line side element 200 further includes:

a second bandwidth adjusting component 201, configured to determine, according to the quantity of the first timeslots dynamically adjusted by the first timeslot managing component, a bandwidth flow required to be adjusted;

a second timeslot managing component 202, configured to configure, according to the bandwidth flow required to be adjusted, the quantity of the second timeslots matched with the first timeslots.

Figure 6:
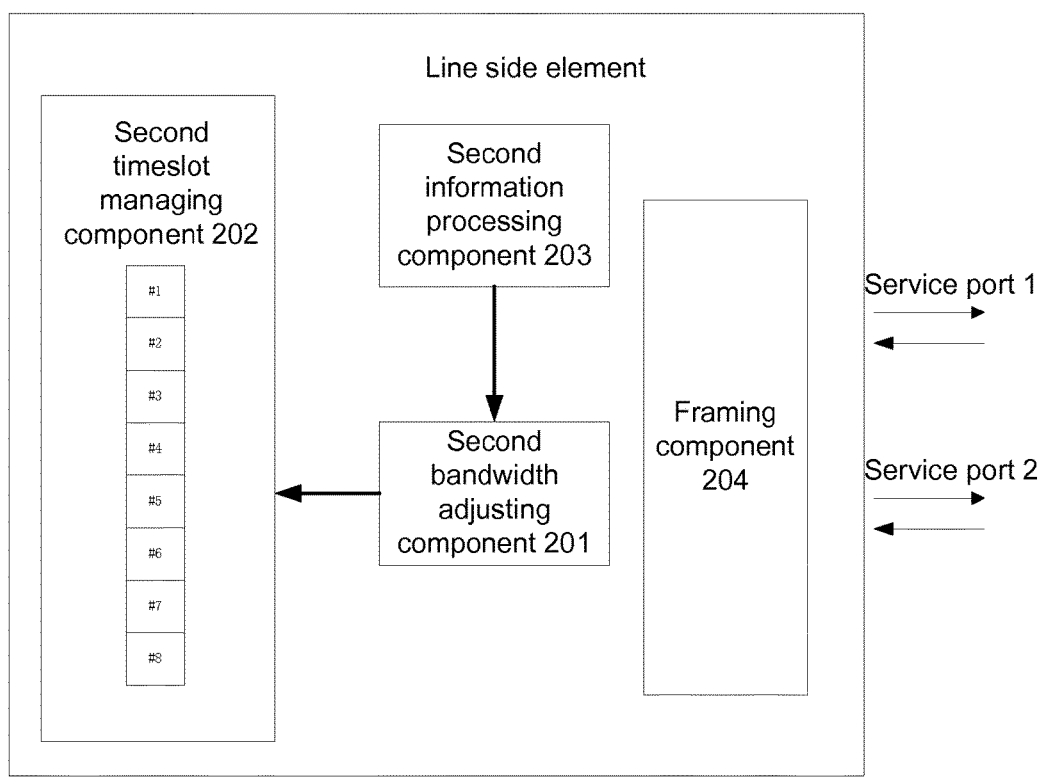
FIG. 6 is a diagram illustrating internal functions of the line side element according to an embodiment of the present disclosure.

FIG. 6 shows a diagram illustrating internal functions of the line side element according to an embodiment of the present disclosure. The line side element 200 further includes: a second information processing component 203 and a framing component 204, wherein the second information processing component 203 is configured to receive a control signal for controlling the quantity of the second timeslots, control, according to the received control signal, the quantity of the second time slots. The framing component 204 is configured to generate a frame from the data service, and transmit the frame. The data service of the embodiment is transmitted to a line via the service ports 1 and 2. Of course, a plurality of service ports may be further set as required.

The tunnel managing element 300 of the present disclosure is configured adjust the quantity of tunnels for transmitting the data service, and is further configured to:

add one unblocked ODU tunnel between the client side element and the line side element and used for transmitting the added first timeslots when it is necessary to increase the quantity of the first timeslots; and adjust, according to the quantity of first timeslots to be decreased, the unblocked ODU tunnels between the client side element and the line side element when it is necessary to decrease the quantity of the first timeslots.

Figure 7:
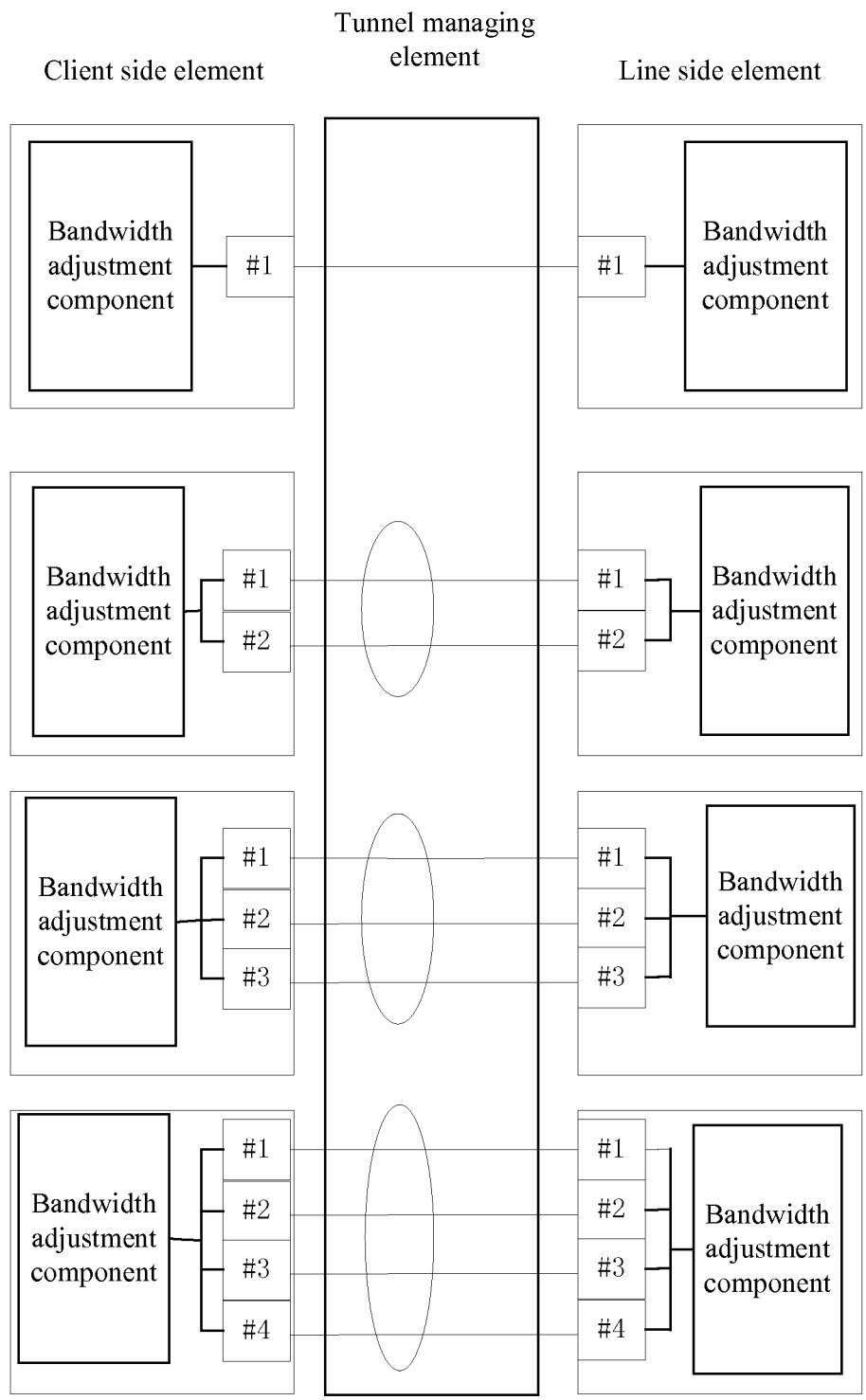
FIG. 7 is a structural diagram illustrating an increase in timeslots according to an embodiment of the present disclosure.

FIG. 7 shows a structural diagram illustrating an increase in timeslots according to an embodiment of the present disclosure. A Bandwidth adjustment component of a client side element sends added bandwidth flow information to a first timeslot managing component. The first timeslot managing component adds timeslots according to the bandwidth flow required to be increased. A line side element correspondingly adjusts the second time slots matched with the first time slots. The client side element and the line side element of the embodiment add a timeslot in turn. In a first stage, the client side element and the line side element are provided with an ODU tunnel. A timeslot is provided in the ODU tunnel. A corresponding relation between a timeslot#1 of the client side element and a timeslot#1 of the line side element is established, and the service data is carried by a first ODU tunnel between the two timeslots. In the second stage, the client side element adds a timeslot#2 according to the bandwidth flow, and the line side element adds a timeslot#2 correspondingly. A second ODU tunnel is established between the client side element and the line side element. The second ODU tunnel and the first ODU tunnel carry the service data together. In the third stage, the client side element adds a timeslot#3 according to the bandwidth flow, and the line side element adds a timeslot#3 correspondingly. The third ODU tunnel is established between the client side element and the line side element. The third ODU tunnel carries the service data together with the first ODU tunnel and the second ODU tunnel. Timeslots are added one by one in the embodiment, and may be further added by two or more at one time, and there is one ODU tunnel corresponding to timeslots added each time. For example, if three timeslots need to be added according to the bandwidth flow, three timeslots are added at the client side element, three timeslots are added at the line side element correspondingly, and an ODU tunnel is added at the client side element and the line side element so that the added ODU tunnel carries the same data service together with the original ODU tunnel.

The principle of decreasing timeslots is the same as the principle of increasing timeslots in the present disclosure. When the client side element needs to decrease a timeslot according to the bandwidth flow, it is necessary to perform determination according to the quantity of timeslots in an ODU tunnel. When there is only one timeslot in the ODU tunnel, the ODU tunnel is deleted. If there are two or more timeslots in the ODU tunnel, the ODU tunnel may be maintained unchanged or a new tunnel is established again so that timeslots of the line side element are consistent with those of the client side element. The adjusted ODU tunnels also carry the data service together in the case that the timeslots of the client side element and the line side element are decreased.

Figure 8:
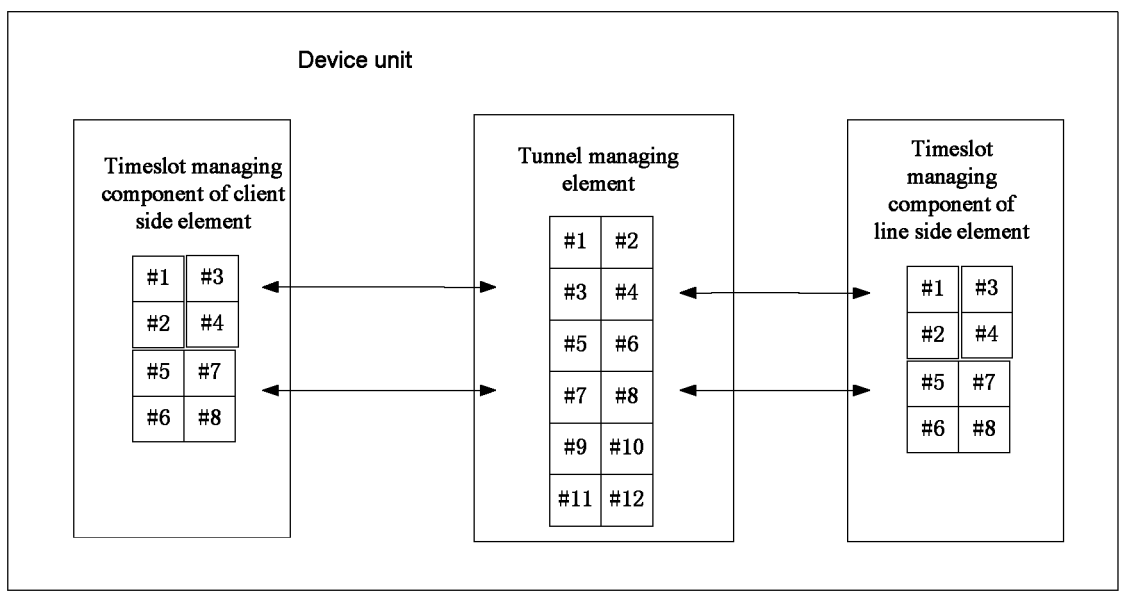
FIG. 8 is a structural block diagram illustrating functions of a device unit according to an embodiment of the present disclosure.

FIG. 8 shows a structural block diagram illustrating functions of a device unit according to an embodiment of the present disclosure. A client side element and a line side element establish a timeslot sequence set respectively. A tunnel managing element establishes an ODU tunnel according to the timeslots of the client side element and the line side element, thereby connecting the client side element and the line side element so as to transmit a data service.

A device unit is further provided in the embodiment of the present disclosure, including:

a client side element, configured to dynamically adjust the quantity of the first timeslots according to a bandwidth of a received data service before the data service is mapped to an ODU tunnel; a line side element, configured to configure, according to the quantity of the first timeslots adjusted by the client side element, the quantity of the second timeslots matched with the first timeslots; a tunnel managing element, configured to adjust, according to the quantity of the first timeslots and the quantity of the second timeslots, the quantity of the unblocked ODU tunnels between the client side element and the line side element, wherein unblocked ODU tunnels after the adjustment carry the data service; a controlling element, configured to receive the quantity of the first timeslots sent by the client side element, and send the quantity of the first timeslots to the line side element to adjust the quantity of the second timeslots, and configured to receive the adjusted result of the quantity of the second timeslots responded by the line side element, and configured to send to the tunnel managing element, according to the quantity of the first timeslots and the quantity of the second timeslots, an instruction for adjusting the quantity of the unblocked ODU tunnels between the client side element and the line side element.

FIG. 9 shows a structural block diagram of a system for adjusting a tunnel bandwidth according to an embodiment of the present disclosure, including:

an initial node device 1, configured to dynamically adjust the quantity of timeslots according to a bandwidth of a received data service, and configured to adjust, according to the adjusted quantity of the timeslots, the quantity of ODU tunnels for carrying the received data service, and transmit bandwidth adjustment information to an intermediate node device and an end node device; the intermediate node device 2, configured to receive the bandwidth adjustment information transmitted by the initial node device, and correspondingly adjust the quantity of the timeslots and the quantity of the ODU tunnels for carrying the data service; the end node device 3, configured to receive the bandwidth adjustment information transmitted by the initial node device, and correspondingly adjust the quantity of the timeslots and the quantity of the ODU tunnels for carrying the data service.

FIG. 10 shows a hierarchical graph of a system for adjusting a tunnel bandwidth according to an embodiment of the present disclosure. The system includes an initial node device, a plurality of intermediate node devices and an end node device. Service data passes through the initial node device, the intermediate node devices and the end node device in turn. Each node device is connected to a controlling element, and the controlling elements are all connected to a network manager. The initial node device receives a data service, adjusts the quantity of timeslots according to a bandwidth of the received data service, and sends a signal to a controlling element. The controlling element adjusts, according to a control instruction of the network manager, timeslots of the initial node device and the quantity of the ODU tunnels for carrying the data service, and transmits bandwidth adjustment information to the intermediate node devices and the end node device. The intermediate node devices and the end node device receive the bandwidth adjustment information transmitted by the initial node, and correspondingly adjust the quantity of timeslots and the quantity of the ODU tunnels for carrying the data service.

FIG. 11 shows a structural diagram of a message of bandwidth adjustment information according to an embodiment of the present disclosure. The message of the bandwidth adjustment information includes: a node identifier, an adjustment request identifier, a port serial number of a client side element, a timeslot sequence set, a timeslot sequence set, a port serial number of a line side element and a timeslot sequence set, wherein the node identifiers correspond to ports of node devices and the adjustment request identifier is requested bandwidth adjustment information. Since a corresponding relation between a port serial number of each node and a corresponding timeslot sequence set is established, a data service is transmitted by the structure of the message, and it is ensured that the same service is carried before or after the adjustment on the ODU tunnels. The bandwidth adjustment information includes node identifier information, adjustment request identifier information, service path information (port serial number information) and timeslot sequence set information.

An initiator of bandwidth adjustment, i.e. a client side element of an initial node initiatively reports the adjustment request identifier information and the timeslot sequence set information to a controlling element of the initial node. The controlling element of the initial node performs analysis and calculation for the main reason of calculating and re-establishing the relation between the timeslot sequence set information and the service path information, and delivers bandwidth adjustment information acquired after the calculation to the client side element, a tunnel managing element (generally a centralized controlling element of electrical cross-connection) and the line side element of the initial node to notify the device units (the client side element, the tunnel managing element and the line side element) of the initial node to adjust and alter timeslot sequence sets. An intermediate node and the end node may acquire the bandwidth adjustment information by two methods, one of which is a centralized method, including that the bandwidth adjustment information is reported to the network manager by the controlling element of the initial node, and delivered by the network manager to controlling elements of the intermediate node and the end node in a unified manner; each controlling element analyzes and calculates, according to the received bandwidth adjustment information, bandwidth adjustment information of the node itself, and then delivers to a node device unit (a client side element, a tunnel managing element and a line side element) where the node locates. The second method is a distributed method, including that the bandwidth adjustment information is transmitted in controlling elements of the nodes in turn; after receiving the bandwidth adjustment information sent by a controlling element of an upstream node, a controlling element of each node analyzes and calculates bandwidth adjustment information of the node, and then delivers the bandwidth adjustment information to a device unit (a client side element, a tunnel managing element and a line side element) of the node. The network manager is able to learn the bandwidth adjustment information in the centralized method and the distributed method.

An increase process and a decrease process of a bandwidth will be described below in combination with the embodiments.

1. An increase process of a bandwidth:

Step 1: A bandwidth detecting component of a client side element of an initial node detects that a current bandwidth flow exceeds a preset threshold.

Step 2: A bandwidth adjustment component of the client side element of the initial node calculates a use condition of timeslots of the node, and judges whether the adjustment may be performed.

Step 3: An information processing component of the client side element of the initial node initiatively requests a controlling element of the initial node for adjustment of increasing a bandwidth.

Step 4: The controlling element of the initial node adds a timeslot, re-calculates bandwidth adjustment information, and delivers the bandwidth adjustment information of the initial node to a device unit of the initial node.

Step 5: A bandwidth adjustment component of a device unit of the initial node executes the timeslot adjustment, and a timeslot tunnel connection is added in FIG. 3.

Step 6: The controlling element of the initial node transmits, in a centralized manner or a distributed manner, the bandwidth adjustment information to controlling elements of an intermediate node and an end node.

Step 7: The controlling elements of the intermediate node and the end node deliver the received bandwidth adjustment information to an information processing component of a device unit of the current network element.

Step 8: Bandwidth adjustment components of device units of the intermediate node and the end node execute timeslot adjustment according to information content processed by the information processing components.

2. A decrease process of a bandwidth:

Step 1: A bandwidth detecting component of a client side element of an initial node detects that a current bandwidth flow is lower than a preset threshold.

Step 2: A bandwidth adjustment component of the client side element of the initial node calculates a use condition of timeslots of the node, and judges whether the adjustment may be performed.

Step 3: An information processing component of the client side element of the initial node initiatively requests a controlling element of the initial node for adjustment of decreasing a bandwidth.

Step 4: The controlling element of the initial node deletes a timeslot, re-calculates bandwidth adjustment information, and delivers the bandwidth adjustment information of the initial node to a device unit of the initial node.

Step 5: A bandwidth adjustment component of a device unit of the initial node executes the timeslot adjustment.

Step 6: The controlling element of the initial node transmits, in a centralized manner or a distributed manner, the bandwidth adjustment information to controlling elements of an intermediate node and an end node.

Step 7: The controlling elements of the intermediate node and the end node deliver the received bandwidth adjustment information to an information processing component of a device unit of the current network element.

Step 8: Bandwidth adjustment components of device units of the intermediate node and the end node execute timeslot adjustment according to information content processed by the information processing components.

Figure 12:
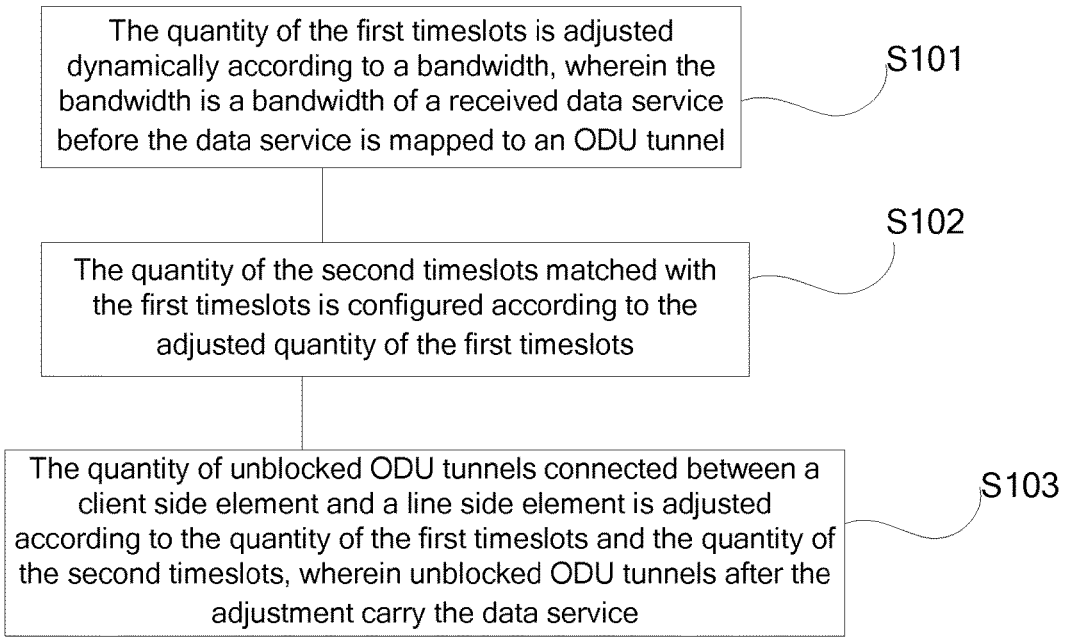
FIG. 12 is a flowchart of a method for automatically adjusting a tunnel bandwidth according to an embodiment of the present disclosure.

FIG. 12 shows a flowchart of a method for automatically adjusting a tunnel bandwidth according to an embodiment of the present disclosure. The method includes the following steps.

Step 101: The quantity of the first timeslots is adjusted dynamically according to a bandwidth of a received data service before the received data service is mapped to an ODU tunnel.

Step 201: The quantity of the second timeslots matched with first timeslots is configured according to the adjusted the quantity of the first timeslots.

Step 301: The quantity of unblocked ODU tunnels between client side element and the line side element is adjusted according to the quantity of the first timeslots and the quantity of the second timeslots, wherein unblocked ODU tunnels after the adjustment carry the data service.

In the method for automatically adjusting a tunnel bandwidth of the present disclosure, the bandwidth mapped to the ODU tunnel is detected, and compared with a preset bandwidth threshold, and according to a comparison result, the quantity of the unblocked ODU tunnels for carrying the data service is adjusted, wherein unblocked ODU tunnels after the adjustment carry the data service, thereby reducing the amount of transmitted information during the bandwidth adjustment while existing bandwidth adjustment applies ODUflex which complicates an OTN container.

Figure 13:
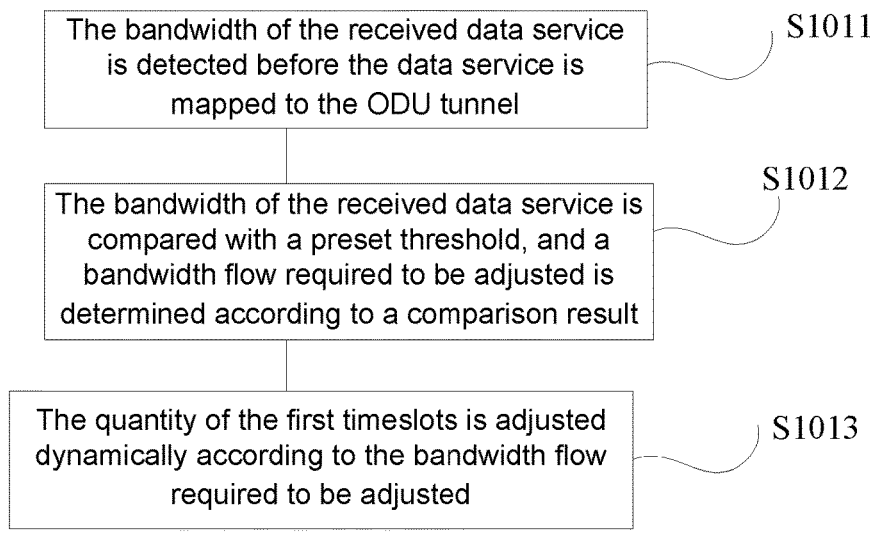
FIG. 13 is a flowchart of adjusting first timeslots in a tunnel bandwidth according to an embodiment of the present disclosure.

FIG. 13 shows flowchart of adjusting first timeslots in a tunnel bandwidth according to an embodiment of the present disclosure, including the following steps.

Step 1011: The bandwidth of the received data service is detected before the data service is mapped to the ODU tunnel.

Step 1012: The bandwidth of the received data service is compared with a preset threshold, and a bandwidth flow required to be adjusted is determined according to a comparison result.

Step 1013: The quantity of the first timeslots is adjusted dynamically according to the bandwidth flow required to be adjusted.

Figure 14:
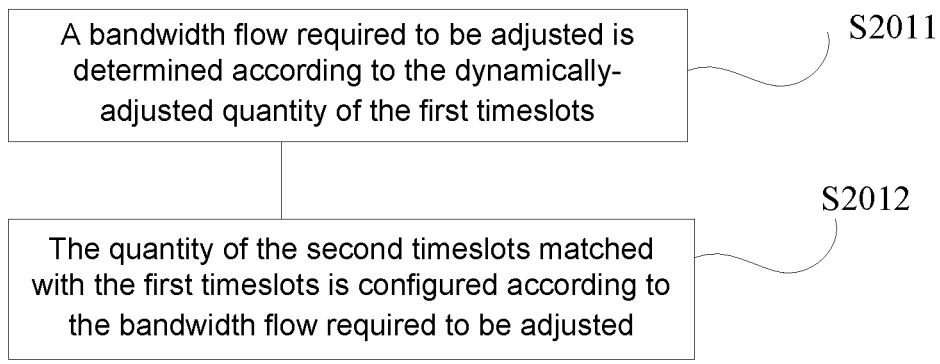
FIG. 14 is a flowchart of adjusting second timeslots in a tunnel bandwidth according to an embodiment of the present disclosure.

FIG. 14 shows a flowchart of adjusting second timeslots in a tunnel bandwidth according to an embodiment of the present disclosure. The step that the quantity of the second timeslots matched with the first timeslots is configured according to the quantity of the adjusted first timeslots further includes the following steps.

Step 2011: A bandwidth flow required to be adjusted is determined according to the dynamically-adjusted quantity of the first timeslots.

Step 2012: The quantity of the second timeslots matched with the first timeslots is configured according to the bandwidth flow required to be adjusted, wherein in Step 2012, the step that the quantity of the unblocked ODU tunnels between the client side element and the line side element is adjusted according to the quantity of the first timeslots and the quantity of the second timeslots further includes that an unblocked ODU tunnel between the client side element and the line side element and configured to transmit added timeslots is added when it is necessary to increase the quantity of the first timeslots; and the unblocked ODU tunnels between the client side element and the line side element are adjusted according to the quantity of the decreased first timeslots when it is necessary to decrease the quantity of the first timeslots.

A corresponding relation is established between a service path of the data service and the first timeslots as well as the second timeslots so that the ODU tunnels carry a consistent data service before and after the adjustment.

The technical solution has the following beneficial effect: a device unit of the present disclosure flexibly controls the usage of an ODU0 timeslot in an ODU of each stage when a bandwidth of a received data service increases or decreases, and does not need to use a complicated ODUflex frame format, thereby meeting the requirement of automatically adjusting the bandwidth without using ODUflex.

What are described above are preferred embodiments of the present disclosure. It should be pointed out that several improvements and modifications may be also made without departing from the principles of the present disclosure for those of ordinary skills in the art, and these improvements and modifications shall be also regarded as the protection scope of the present disclosure.

INDUSTRIAL APPLICABILITY

As described above, the device unit, the node device, and the method and system for adjusting a tunnel bandwidth according to the embodiments of the present disclosure have the following beneficial effect: the device unit of the present disclosure flexibly controls the usage of the ODU0 timeslot in the ODU of each stage when the bandwidth of the received data service increases or decreases, and does not need to use the complicated ODUflex frame format, thereby meeting the requirement of automatically adjusting the bandwidth without using ODUflex.

What is claimed is:

1. A device unit, comprising:
   a client side element, configured to dynamically adjust quantity of first timeslots according to a bandwidth, wherein the bandwidth is a bandwidth of a received data service before the received data service is mapped to an Optical Channel Data Unit (ODU) tunnel;
   a line side element, configured to configure, according to the quantity of the first timeslots adjusted by the client side element, quantity of second timeslots matched with the first timeslots;
   a tunnel managing element, configured to adjust, according to the quantity of the first timeslots and the quantity of the second timeslots, the quantity of unblocked ODU tunnels between the client side element and the line side element, wherein unblocked ODU tunnels after the adjustment carry the data service;
   wherein the quantity of first timeslots is quantity of timeslots in OTN (Optical Transport Network) of the client side element in place of conventionally used ODUflex; the quantity of second timeslots is quantity of timeslots in OTN of the line side element in place of conventionally used ODUflex;
   wherein the client side element further comprises:
   a bandwidth detecting component, configured to detect the bandwidth of the received data service before the data service is mapped to the ODU tunnel;
   a first bandwidth adjusting component, configured to compare the bandwidth of the received data service with a preset threshold, and determine, according to a comparison result, a bandwidth flow required to be adjusted; and
   a first timeslot managing component, configured to dynamically adjust the quantity of the first timeslots according to the bandwidth flow required to be adjusted.

2. The device unit according to claim 1, wherein the client side element further comprises:

a bandwidth compressing component, configured to compress the received data service, and transmit the compressed data service to the bandwidth detecting component.

3. The device unit according to claim 1, wherein the line side element further comprises:
a second bandwidth adjusting component, configured to determine, according to the quantity of the first timeslots dynamically adjusted by a first timeslot managing component, a bandwidth flow required to be adjusted;
a second timeslot managing component, configured to configure, according to the bandwidth flow required to be adjusted, the quantity of the second timeslots matched with the first timeslots.

4. The device unit according to claim 1, wherein the tunnel managing element is further configured to:
add one unblocked ODU tunnel between the client side element and the line side element and used for transmitting added first timeslots when it is necessary to increase the quantity of the first timeslots; and
adjust, according to the quantity of first timeslots to be decreased, the unblocked ODU tunnels between the client side element and the line side element when it is necessary to decrease the quantity of the first timeslots.

5. A system for adjusting a tunnel bandwidth, comprising:
an initial node device, configured to dynamically adjust quantity of timeslots according to a bandwidth of a received data service, and configured to adjust, according to the adjusted quantity of the timeslots, the quantity of Optical Channel Data Unit (ODU) tunnels for carrying the received data service, and transmit bandwidth adjustment information to an intermediate node device and an end node device;
the intermediate node device, configured to receive the bandwidth adjustment information transmitted by the initial node device, and correspondingly adjust the quantity of the timeslots and the quantity of the ODU tunnels for carrying the data service;
the end node device, configured to receive the bandwidth adjustment information transmitted by the initial node device, and correspondingly adjust the quantity of the timeslots and the quantity of the ODU tunnels for carrying the data service;
wherein the quantity of the timeslots is quantity of timeslots in OTN (Optical Transport Network) in place of conventionally used ODUflex;
wherein the initial node device comprises a client side element, a line side element and a tunnel managing element; wherein
the client side element, configured to dynamically adjust quantity of first timeslots according to a bandwidth, and the bandwidth is a bandwidth of a received data service before the received data service is mapped to an Optical Channel Data Unit (ODU) tunnel;
the line side element, configured to configure, according to the quantity of the first timeslots adjusted by the client side element, quantity of second timeslots matched with the first timeslots;
the tunnel managing element, configured to adjust, according to the quantity of the first timeslots and the quantity of the second timeslots, the quantity of unblocked ODU tunnels between the client side element and the line side element, wherein unblocked ODU tunnels after the adjustment carry the data service;
wherein the client side element further comprises:

a bandwidth detecting component, configured to detect the bandwidth of the received data service before the data service is mapped to the ODU tunnel;
a first bandwidth adjusting component, configured to compare the bandwidth of the received data service with a preset threshold, and determine, according to a comparison result, a bandwidth flow required to be adjusted; and
a first timeslot managing component, configured to dynamically adjust the quantity of the first timeslots according to the bandwidth flow required to be adjusted.

6. The system according to claim 5, wherein the bandwidth adjustment information is transmitted to the intermediate node device and the end node device in a centralized manner or a distributed manner.

7. A method for automatically adjusting a tunnel bandwidth, comprising:
dynamically adjusting quantity of first timeslots according to a bandwidth, wherein the bandwidth is a bandwidth of a received data service before the data service is mapped to an Optical Channel Data Unit (ODU) tunnel;
configuring, according to the adjusted quantity of the first timeslots, quantity of second timeslots matched with the first timeslots;
adjusting, according to the quantity of the first timeslots and the quantity of the second timeslots, the quantity of unblocked ODU tunnels between the client side element and the line side element, wherein unblocked ODU tunnels after the adjustment carry the data service;
wherein the quantity of first timeslots and the quantity of second timeslots are both quantity of timeslots in OTN (Optical Transport Network) in place of conventionally used ODUflex;
wherein dynamically adjusting the quantity of the first timeslots according to the bandwidth of the data service before the data service is mapped to the ODU tunnel further comprises: detecting the bandwidth of the received data service before the data service is mapped to the ODU tunnel; comparing the bandwidth of the received data service with a preset threshold, and determining, according to a comparison result, a bandwidth flow required to be adjusted; dynamically adjusting the quantity of the first timeslots according to the bandwidth flow required to be adjusted.

8. The method according to claim 7, wherein configuring, according to the adjusted quantity of the first timeslots, the quantity of the second timeslots matched with the first timeslots further comprises:
determining, according to the dynamically-adjusted quantity of the first timeslots, a bandwidth flow required to be adjusted;
configuring, according to the bandwidth flow required to be adjusted, the quantity of the second timeslots matched with the first timeslots.

9. The method according to claim 7, wherein adjusting, according to the quantity of the first timeslots and the quantity of the second timeslots, the quantity of the unblocked ODU tunnels between the client side element and the line side element, wherein unblocked ODU tunnels after the adjustment carry the data service further comprises:
adding one unblocked ODU tunnel between the client side element and the line side element and used for transmitting added first timeslots when it is necessary to increase the quantity of the first timeslots; and adjusting, according to the quantity of first timeslots to be decreased, the unblocked ODU tunnels between the client side element and the line side element when it is necessary to decrease the quantity of the first timeslots.

10. The method according to claim 7, wherein a corresponding relation is established between a service path of the data service and the first timeslots as well as the second timeslots so that the ODU tunnels carry a consistent data service before and after adjustment.

11. The device unit according to claim 2, wherein the tunnel managing element is further configured to:
add one unblocked ODU tunnel between the client side element and the line side element and used for transmitting added first timeslots when it is necessary to increase the quantity of the first timeslots; and
adjust, according to the quantity of first timeslots to be decreased, the unblocked ODU tunnels between the client side element and the line side element when it is necessary to decrease the quantity of the first timeslots.

12. The device unit according to claim 3, wherein the tunnel managing element is further configured to:
add one unblocked ODU tunnel between the client side element and the line side element and used for transmitting added first timeslots when it is necessary to increase the quantity of the first timeslots; and
adjust, according to the quantity of first timeslots to be decreased, the unblocked ODU tunnels between the client side element and the line side element when it is necessary to decrease the quantity of the first timeslots.

13. The method according to claim 8, wherein a corresponding relation is established between a service path of the data service and the first timeslots as well as the second timeslots so that the ODU tunnels carry a consistent data service before and after adjustment.

14. The method according to claim 9, wherein a corresponding relation is established between a service path of the data service and the first timeslots as well as the second timeslots so that the ODU tunnels carry a consistent data service before and after adjustment.

* * * * *